United States Patent [19]

Glanz

[11] 4,050,829
[45] Sept. 27, 1977

[54] DOUBLE-SIGMOID CONNECTOR

[75] Inventor: Ronald Paul Glanz, New Albany, Ind.

[73] Assignee: Chemetron Corporation, Chicago, Ill.

[21] Appl. No.: 679,338

[22] Filed: Apr. 22, 1976

[51] Int. Cl.² ............................................. F16B 1/00
[52] U.S. Cl. ................................. 403/205; 403/271; 285/131; 403/382
[58] Field of Search ............... 403/205, 174, 178, 271, 403/272, 346, 406, 403, 382; 228/153, 6; 285/286, 150, 188, 179, 131, 132

[56] References Cited

U.S. PATENT DOCUMENTS

| 671,053 | 4/1901 | Latta | 403/272 X |
| 706,534 | 8/1902 | Dawson | 403/178 |
| 832,408 | 10/1906 | O'Neill | 285/150 |
| 1,382,607 | 6/1921 | Rathbone et al. | 403/272 |
| 1,552,569 | 9/1925 | Schurman | 403/205 X |
| 3,445,129 | 5/1969 | Penote | 403/174 |

FOREIGN PATENT DOCUMENTS

| 925,325 | 3/1955 | Germany | 285/150 |
| 519,027 | 3/1940 | United Kingdom | 285/286 |

Primary Examiner—Wayne L. Shedd
Attorney, Agent, or Firm—N. M. Esser

[57] ABSTRACT

In a double-sigmoid connector, as used to interconnect structural members in a trusswork and comprises a pair of arcuate elbows joined to each other at their outer peripheral midsections, coaxial outlets are formed in the elbows at their inner peripheral midsections. Accordingly, lateral interconnections may be made.

3 Claims, 1 Drawing Figure

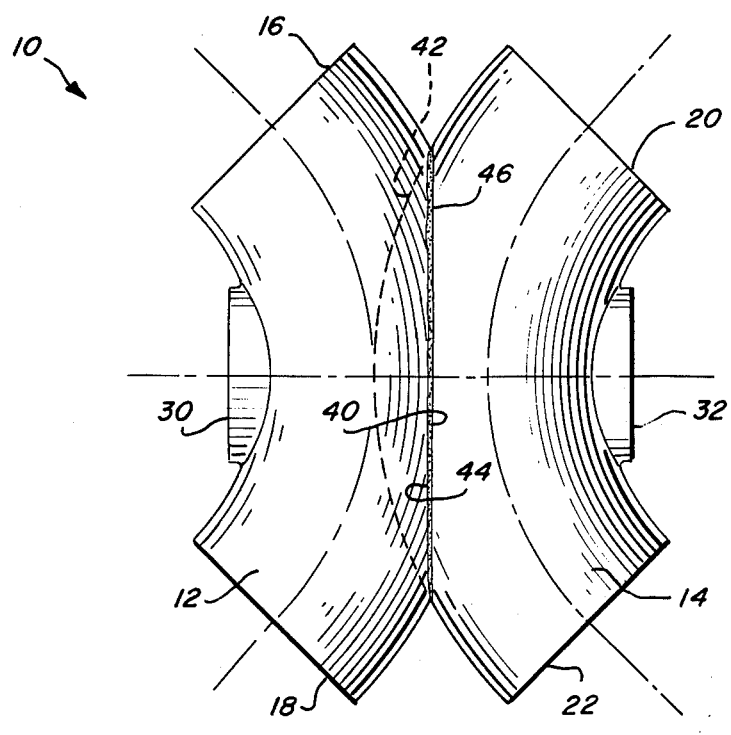

DOUBLE-SIGMOID CONNECTOR

BACKGROUND OF THE INVENTION

Cross-reference is made to an application filed simultaneously herewith by Robert Charles Paulin and Ronald Joseph Billings, said application being commonly assigned herewith. As disclosed in said simultaneously filed application, a double-sigmoid connector has particular utility to interconnect structural members in a trusswork, as in an offshore drilling platform.

SUMMARY OF THE INVENTION

As an improvement in a double-sigmoid connector comprising a pair of arcuate elbows joined to each other at their outer peripheral midsections, an outlet is formed in each elbow at its inner peripheral midsection so as to accomodate lateral pipes for lateral connections.

The foregoing and other objects, features, and advantages of this invention are evident from a more detailed description below of an embodiment of this invention, with particular reference to an accompanying drawing.

BRIEF DESCRIPTION OF THE DRAWING

The drawing contains one FIGURE namely, an elevational view of a double-sigmoid connector constituting an embodiment of this invention.

DETAILED DESCRIPTION OF AN EMBODIMENT

In the drawing, a double-sigmoid connector 10 is shown to comprise a pair of arcuate elbows 12 and 14 respectively. Except as noted below, each elbow is identical. Typically, each elbow may be made of forged steel with 48-inch outer diameter and 1.25-inch wall thickness. Each elbow is shown to have a 90° included angle between its ends. Conventional elbows in these sizes have been commercially available from Chemetron Corporation, Tube Turns Division, Louisville, Ky. 40201, for many years.

In the connector 10, the elbows 12 and 14 have coplanar centerlines, and each elbow has opposite ends normal to its centerlines. The connecter 10 is symmetrical about an axis through the midpoints of these centerlines.

Opposite ends 16 and 18 of the elbow 12 and opposite ends 20 and 22 of the elbow 14 and adapted to be connected respectively by circumferential weldments (not shown) to structural pipes (not shown) of suitable diameter and wall thickness. The ends 16 and 18 and the ends 20 and 22 may be beveled in conventional manner as desired to accomodate such weldments.

An outlet 30 of tubular form at its extremity is either drawn or otherwise formed in the elbow 12 at its inner peripheral midsection. An outlet 32 of tubular form at its extremity is similarly formed in the elbow 14 at its inner peripheral midsection. The outlets 30 and 32 are coaxial with the above-mentioned axis through the midpoints of the centerlines of the elbows 14 and 12.

Typically, each outlet may be formed with 36-inch outer diameter and a proportionate wall thickness. These outlets are adapted to be connected by circumferential weldments (not shown) to structural pipes (not shown) of suitable diameter and wall thickness. These outlets 30 and 32 may be beveled as the ends 16 and 18 or the ends 20 and 22 may be beveled.

Except for the outlets 30 and 32, the connector 10 is similar to the double-sigmoid connector described in the above-mentioned simultaneous filed application of Paulin et al. Thus, a sector (not shown) of the elbow 12 is removed so as to leave an elongated opening 40 in the elbow 12. A sector 42 (phantom lines) of the elbow 14 is similarly removed so as to leave an elongated opening 44 in the elbow 14. The elbows 12 and 14 are joined together by a continuous circumferential weldment 46 around the margins of the openings 40 and 44.

The connector 10 has been described above with exemplary dimensions suitable for an offshore drilling platform and other large-scale structures. Such connectors can also be made to smaller scales for smaller structures.

I claim:

1. A double sigmoid connector comprising: a pair of arcuate pipe elbows having coplanar, arcuate centerlines, one of said pair having an elongated opening in its outer periphery and the other of said pair having a portion of its outer periphery extending into said opening and substantially closing same, said one elbow being rigidly joined to said other elbow around said opening, wherein the improvement comprises: each of said pair of elbows having an outlet formed in its inner periphery and extending inwardly of said inner periphery.

2. The connector of claim 1 in which said connector is symmetric about an axis through said centerlines at their midpoints.

3. The connector of claim 1 in which each elbow has a right included angle between its ends.

* * * * *